(12) United States Patent
McCourt (10) Patent No.: US 7,929,449 B2
(45) Date of Patent: Apr. 19, 2011

(54) SYSTEM, METHOD AND PROGRAM FOR DETERMINING FAILURE IN NETWORK COMMUNICATION

(75) Inventor: Jeremy John McCourt, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 12/130,273

(22) Filed: May 30, 2008

(65) Prior Publication Data

US 2009/0296571 A1    Dec. 3, 2009

(51) Int. Cl.
*H04L 12/26*    (2006.01)
(52) U.S. Cl. ............... 370/248; 370/241; 370/241.1; 370/242; 709/223; 709/224
(58) Field of Classification Search ........... 370/241.1, 370/248, 252; 709/223, 224
See application file for complete search history.

(56) References Cited

U.S. PATENT DOCUMENTS

| 6,173,324 | B1 | 1/2001 | D'Souza | |
|---|---|---|---|---|
| 7,082,531 | B1 | 7/2006 | Chen et al. | |
| 2002/0071390 | A1* | 6/2002 | Reeves et al. | 370/235 |
| 2003/0097438 | A1* | 5/2003 | Bearden et al. | 709/224 |
| 2003/0112832 | A1 | 6/2003 | Tsukamoto | |
| 2003/0191963 | A1* | 10/2003 | Balissat et al. | 713/201 |
| 2004/0255156 | A1 | 12/2004 | Chan et al. | |
| 2005/0257256 | A1 | 11/2005 | Supnik et al. | |
| 2006/0067232 | A1 | 3/2006 | Lee et al. | |
| 2006/0137002 | A1 | 6/2006 | Forrester | |

FOREIGN PATENT DOCUMENTS

WO    2004084038 A2    9/2004

* cited by examiner

*Primary Examiner* — William Trost, IV
*Assistant Examiner* — Siming Liu
(74) *Attorney, Agent, or Firm* — Arthur J. Samodovitz (57) ABSTRACT

System, method and program product for determining a cause of a failure of a communication from a source device to a destination device. A preferred route from the source device to the destination device comprises a series of routers in a forward order. First program instructions determine one or more initial routers in the series in the forward order from the source device toward the destination device. A last of the initial routers does not designate a next router in the series in the forward order toward the destination device. Second program instructions determine the series of routers in a reverse order from the destination device toward the source device. Third program instructions determine from the series of routers in reverse order as determined by the second program instructions which router the last of the initial routers should designate as its next router in the forward order toward the destination device, and send a notification as to which router the last of the initial routers should designate as its next router in the forward order toward the destination device.

15 Claims, 7 Drawing Sheets

SYSTEM, METHOD AND PROGRAM FOR DETERMINING FAILURE IN NETWORK COMMUNICATION

FIELD OF THE INVENTION

The invention relates generally to computer systems and networks, and more specifically to trouble-shooting failures in network communications.

BACKGROUND OF THE INVENTION

Computer networks such as the Internet are well known today. Such networks include communication media, firewalls, routers, network switches and hubs. (Typically, firewalls, network switches and hubs include routers.) Networks often interconnect client computers and servers or other source and destination devices. A destination "device" can be a destination computer or gateway to a subnet. In the case of communications through the Internet, typically there are many routers and many possible routing paths between a source computer and a destination device. When a message arrives at a router, the router makes a decision as to the next router or "hop" in a path to the destination device. There are many known algorithms for making this decision, such as OSPF, RIP, IGRP, EIGRP, ISIS or BGP. Routers using the RIP, OSPF and ISIS protocols attempt to route message packets to a destination device via the shortest path, i.e. fewest number of intervening routers. Routers using the OSPF protocol also can determine the bandwidth of the path to the next hop based on the interface used for forwarding the message packet to the next hop. Routers using the IGRP and EIGRP protocols attempt to route message packets based on greatest bandwidth, shortest delays and shortest path factors. Routers using the BGP protocol attempt to route message packets based on shortest Autonomous System path (i.e. fewest number of routers within a single administrative control) or least multi-exit discriminator ("MED") (i.e. a preference for one route over another that is advertised to neighboring routers, etc.). The OSPF, IGRP, EIGRP and BGP routing functions identify and record more than one route to most destination devices, and attempt to utilize them in an order based on an applicable routing policy.

In a common scenario, a source computer creates a message which it passes to a TCP/IP adapter card. The TCP/IP adapter card divides the message into packets and adds a header for each packet. The header specifies a source IP address and port, destination IP address and port and protocol. The source computer forwards the message packets to a firewall or gateway device (such as a gateway router) for the source computer. Typically, the firewall has a list of permitted message flows ("rules"), i.e. a list of combinations of source IP addresses and ports, destination IP addresses and ports and protocols for message packets that are permitted to pass through the firewall in either direction. Typically, the firewall includes a router as well. If the message packet is entitled to pass through the firewall of the source network, the router determines the "next hop" router en route to the destination device. The router determines the "next hop" based on a known routing protocol, as explained above. The message packet then advances, router by router, to the destination network, where a firewall or gateway device for the destination network forwards the message packet to the destination computer or other destination system (assuming the firewall at the destination network permits the message flow of the packet).

Occasionally, a message fails to reach its destination device. This can be due to a failure of a router in the communication path, a failure or a communication link between the routers in the communication path, proper or improper blockage by a firewall in the communication path, or other reason.

There are several ways that an administrator can learn of such a failure. For example, if the source device does not receive an expected response from the destination device, a user of the source device may call a help desk or otherwise notify an administrator. As another example, if a router in the path does not have a "route" to the destination device or the communication link to the next hop is down, the router can return an error message to the source device.

Upon detection of a failure in the network, an administrator will attempt to identify the cause of the failure and then correct the failure. In the case of a router in the path not having a "route" to the destination device or the communication link to the next hop being down, the error message will indicate the type of problem.

An object of the present invention is to improve trouble-shooting of a failure in network communication.

SUMMARY OF THE INVENTION

The present invention resides in a system, method and program product for determining a cause of a failure of a communication from a source device to a destination device. A preferred route from the source device to the destination device comprises a series of routers in a forward order. First program instructions determine one or more initial routers in the series in the forward order from the source device toward the destination device. A last of the initial routers does not designate a next router in the series in the forward order toward the destination device. Second program instructions determine the series of routers in a reverse order from the destination device toward the source device. Third program instructions determine from the series of routers in reverse order as determined by the second program instructions which router the last of the initial routers should designate as its next router in the forward order toward the destination device, and send a notification as to which router the last of the initial routers should designate as its next router in the forward order toward the destination device.

According to a feature of the present invention, the first program instructions determine the one or more initial routers in the series in forward order in part by querying the source device for its next router toward the destination device and querying the next router of the source device for a next router of the next router of the source device toward the destination device. The second program instructions determine the series of routers in the reverse order from the destination device toward the source device by querying the destination device for its next router toward the source device and querying the next router of the destination device for a next router of the next router of the destination device toward the source device.

According to another feature of the present invention, fourth program instructions determine a firewall in the preferred route and whether the firewall includes a rule to permit flow of the message from the source device to the destination device through the firewall, and if not, generate a notification that the firewall does not includes a rule to permit flow of the message from the source device to the destination device through the firewall.

BRIEF DESCRIPTION OF THE FIGURES

FIGS. 2(A-F) form a flow chart of a network communication trouble-shooting program within the network administration server, according to the present invention.

DETAILED DESCRIPTION OF THE PREFERRED EMBODIMENTS

Figure 1:
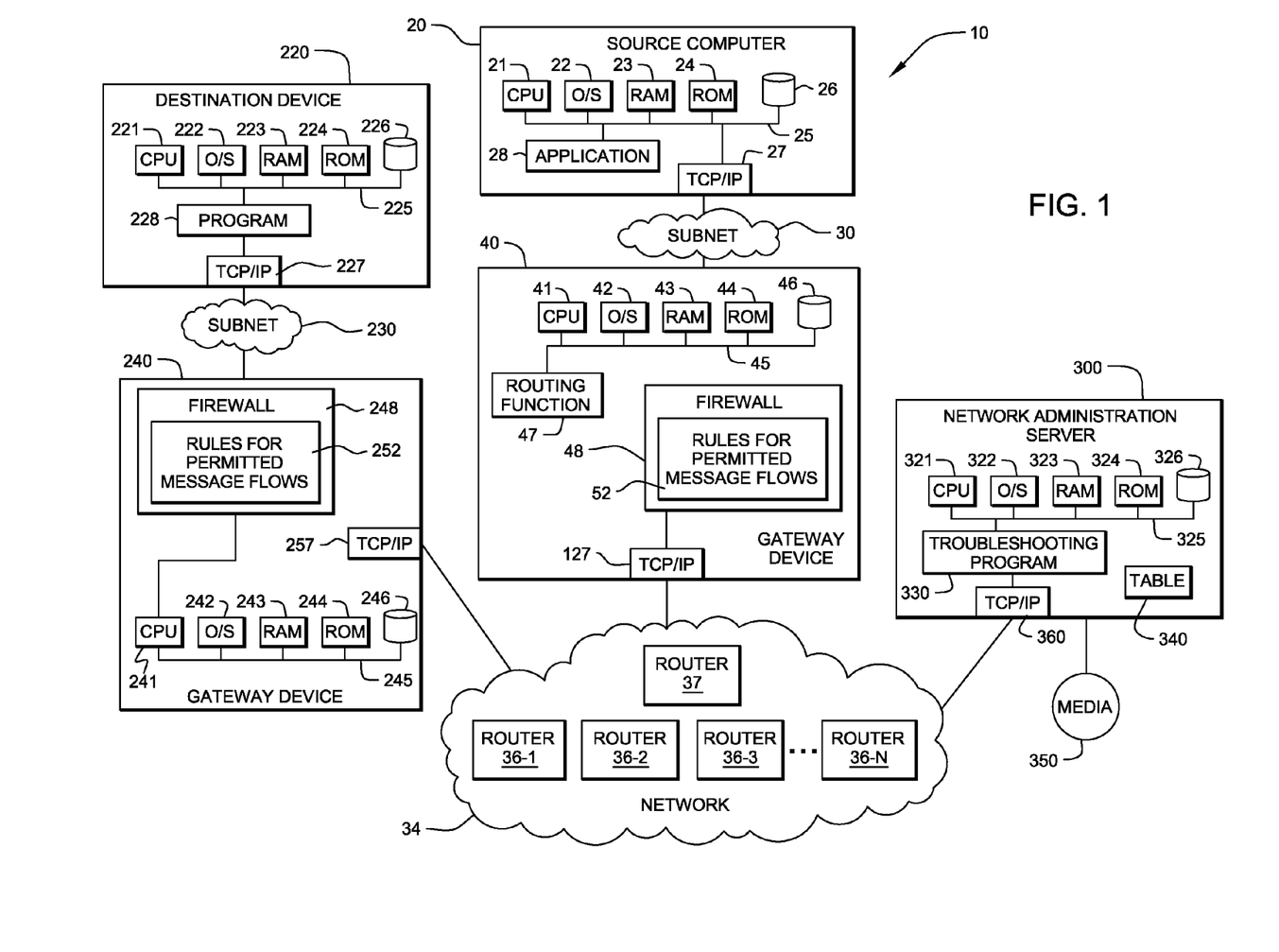
FIG. 1 is a block diagram of a network administration server including the present invention, and a source computer, gateway device, routers and a destination device for a communication for which the network administration server can trouble-shoot a network communication failure.
Figure 2A:
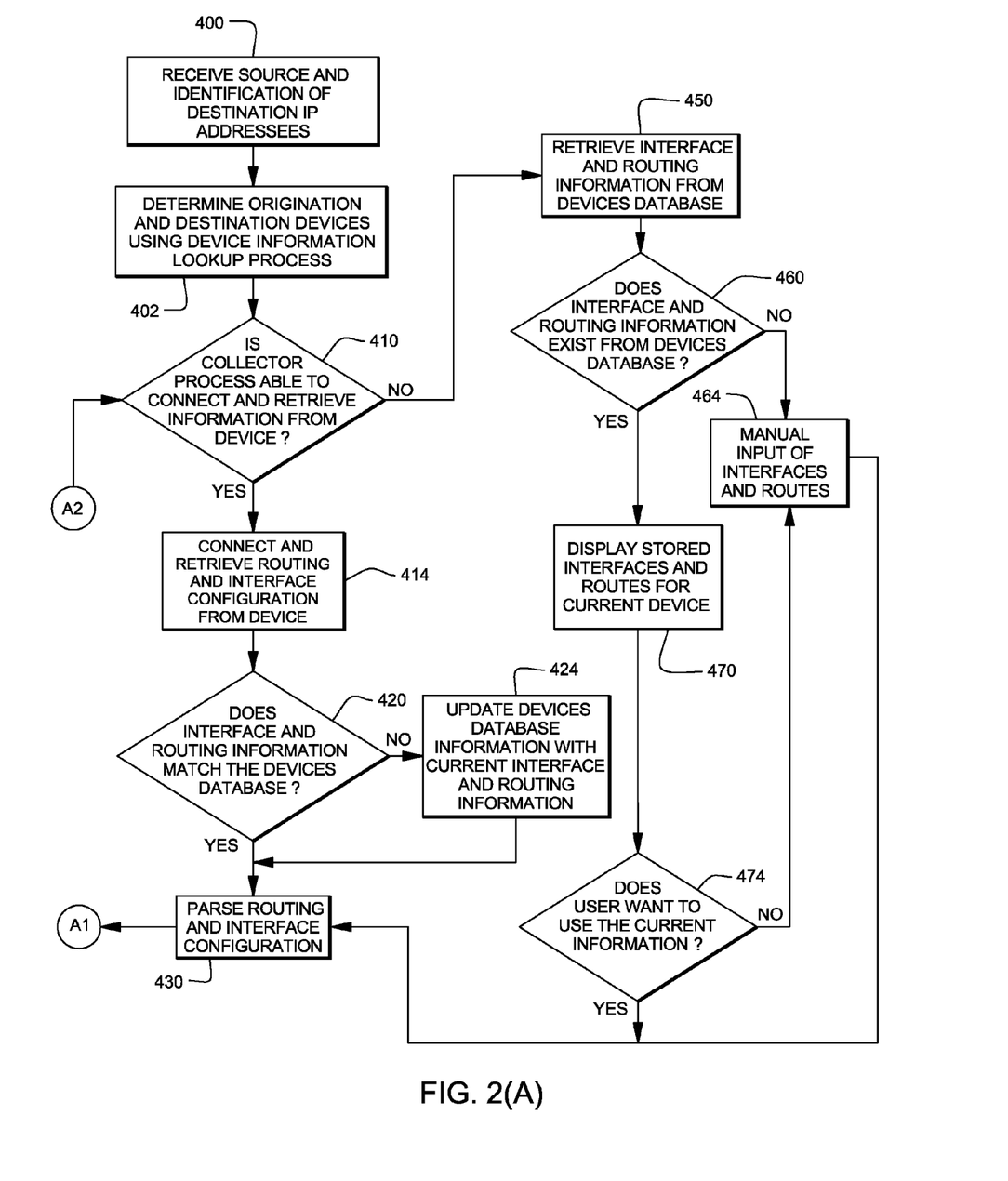
Figure 2B:
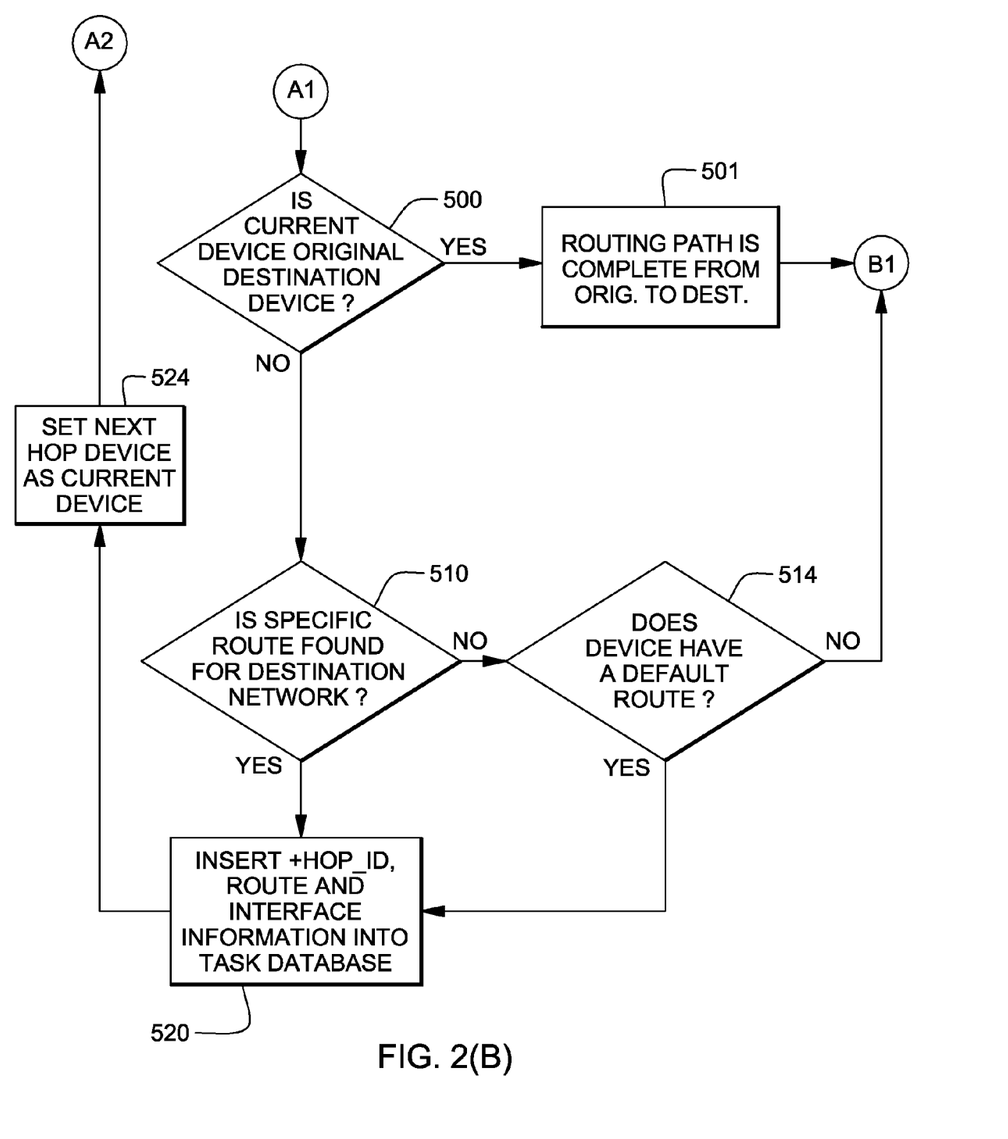
Figure 2C:
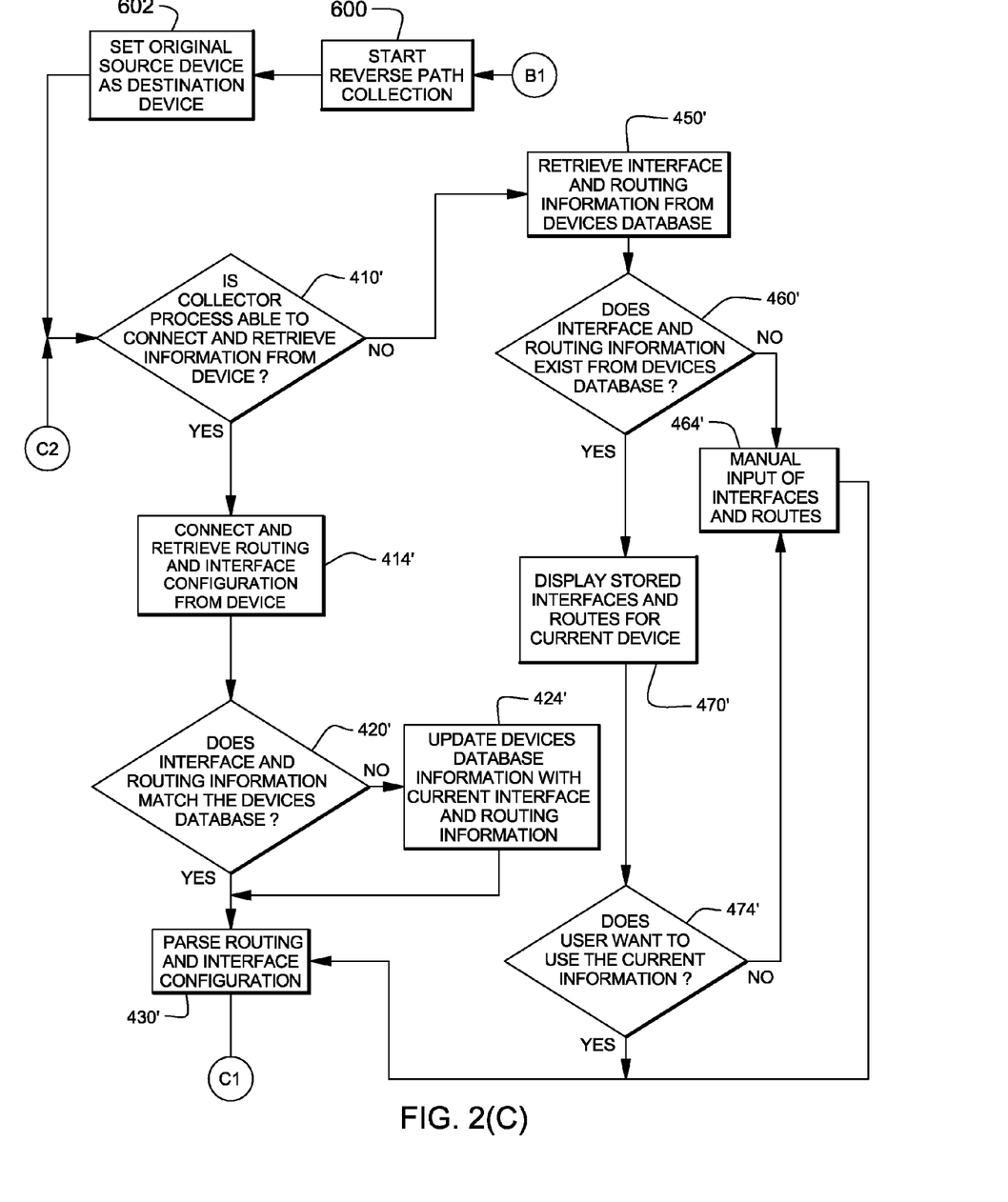
Figure 2D:
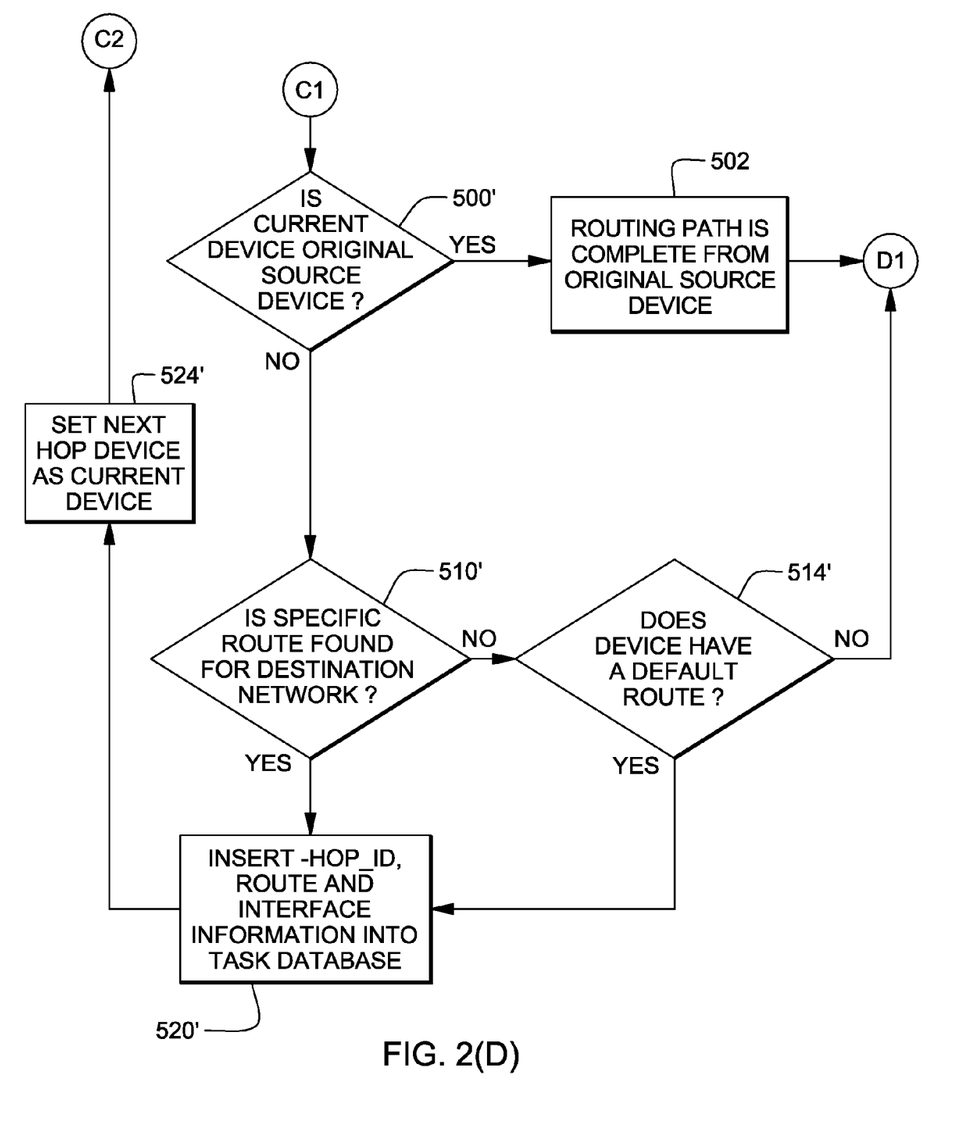
Figure 2E:
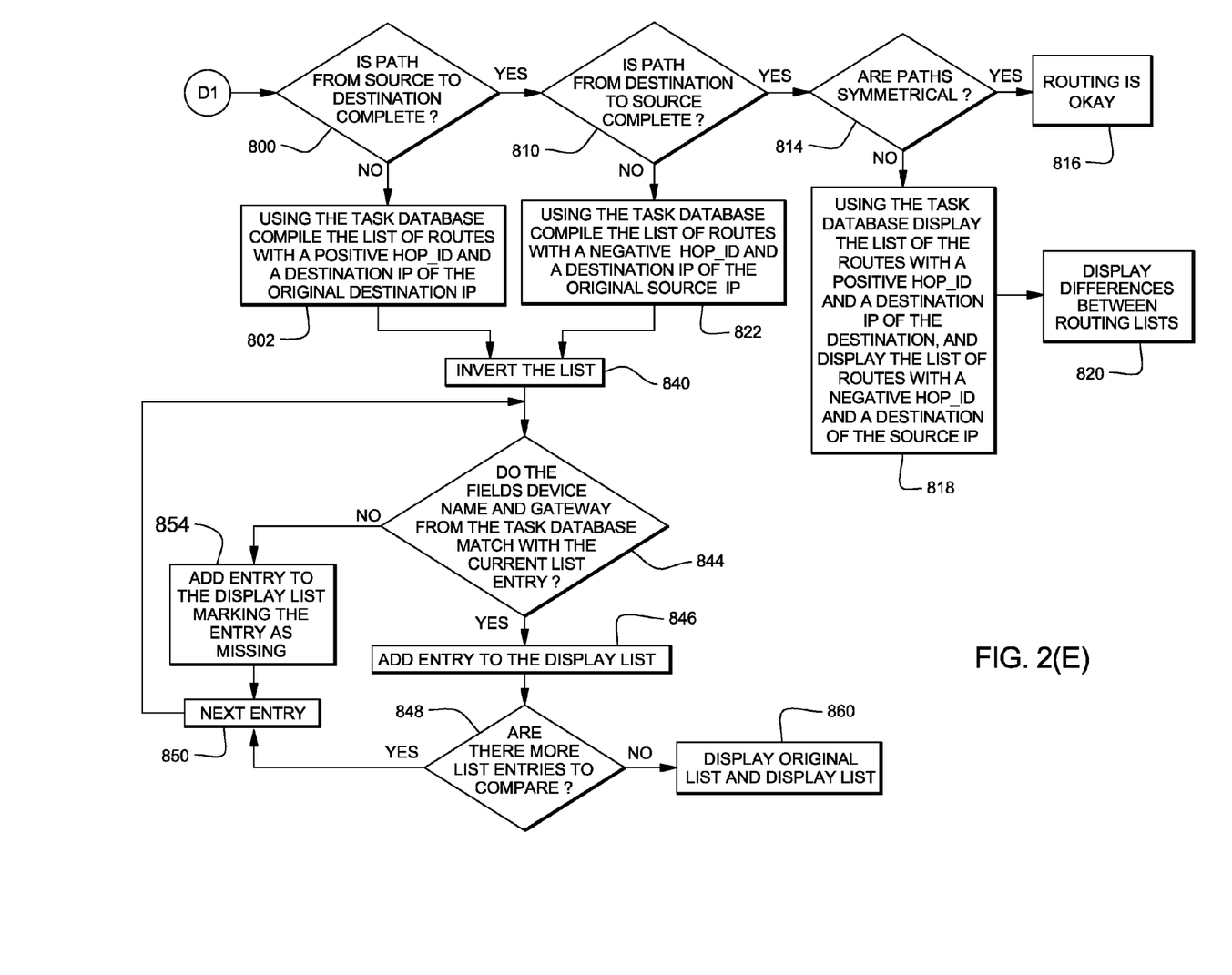
Figure 2F:
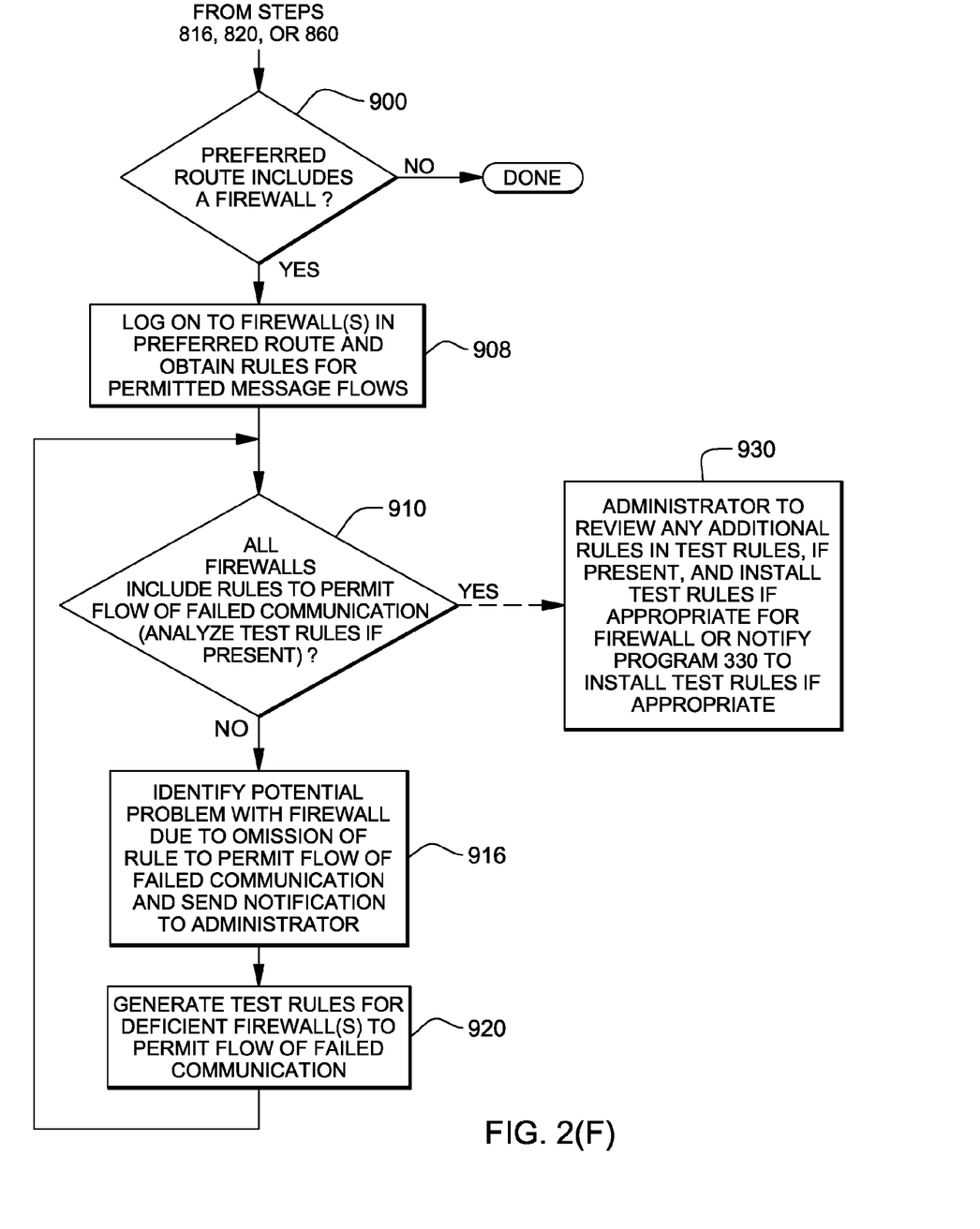

The present invention will now be described in detail with reference to the figures. FIG. 1 illustrates a distributed computer system generally designated 10 in which the present invention is embodied. System 10 comprises a source computer 20 on a subnet 30 and a gateway device (such as a gateway computer) 40 to interface the subnet 30 to a private or public network 34 (such as the public Internet). Network 34 includes a multiplicity of routers, such as network routers 36-1, 36-2, 36-3 . . . 36-N, to forward message packets from gateway device 40 (originating from source computer 20) to a gateway device 240 for a destination subnet 230. The routers can be WAN routers, customer access routers, internal routers of a customer, Internet access routers, routers within the Internet, etc. A destination computer 220 resides on subnet 230, and processes messages sent by source computer 20. Destination computer 220 also sends (responsive and original) messages to source computer 20 via gateway device 240, network routers 36-1, 36-2, 36-3 . . . 36-N and gateway device 40, and source computer 20 processes those messages.

Source computer 20 can be a workstation, server or other type of computer and includes a known CPU 21, operating system 22, RAM 23 and ROM 24 on a common bus 25 and storage 26 and TCP/IP adapter card 27. Source computer 20 also includes a known computer program such as application 28 which generates outgoing messages for destination computer 220 (and other destination computers as well) and also processes incoming messages.

Gateway device 40 includes a known CPU 41, operating system 42, RAM 43 and ROM 44 on a common bus 45 and storage 46 and TCP/IP adapter card 127. Gateway device 40 also includes a known router or routing function 47 (embodied in hardware and/or software) such as OSPF, RIP, ISIS, IGRP, EIGRP or BGP routing function. These known routing functions identify and record one or more routing paths or "routes" such as nodes (i.e. routers, firewalls, etc.) to destination devices (for example, destination subnets or destination computers). Other routing functions that identify and record one or more routing paths to destination devices can be used as well for routing function 47. The known RIP, OSPF and ISIS routing functions attempt to route message packets to a destination device via the shortest path, i.e. fewest number of intervening routers. The known OSPF routing function also can determine the bandwidth of the path to the next hop based on the interface used for forwarding the message packet to the next hop. The known IGRP and EIGRP routing functions attempt to route message packets based on greatest bandwidth, shortest delays and shortest path factors. The known BGP routing function attempts to route message packets based on shortest Autonomous System path (i.e. fewest number of routers within a single administrative control) or least multi-exit discriminator ("MED") (i.e. a preference for one route over another that is advertised to neighboring routers, etc.). The OSPF, IGRP, EIGRP and BGP routing functions identify and record one or more routes to most devices, and attempt to utilize them in order based on the applicable routing policy.

Gateway device 40 also includes a known firewall 48 and TCP/IP adapter card 257. Firewall 48 has a list 52 of permitted message flows ("rules"), i.e. a list of combinations of source IP addresses and ports, destination IP addresses and ports and protocols for message packets that are permitted to pass through the firewall 48 in each direction.

Destination computer 220 can be a workstation, server or other type of computer and includes a known CPU 221, operating system 222, RAM 223 and ROM 224 on a common bus 225 and storage 226 and TCP/IP adapter card 227. Destination computer 220 also includes a known computer program 228 which generates outgoing messages for source computer 20 (and other destination computers as well) and also processes incoming messages from source computer 20 (and other source computers as well).

Gateway device 240 includes a known CPU 241, operating system 242, RAM 243 and ROM 244 on a common bus 245 and storage 246. Gateway device 240 also includes a known router or routing function 247 (embodied in hardware and/or software) such as OSPF, RIP, ISIS, IGRP, EIGRP or BGP routing function. These known routing functions identify and record one or more routing paths to destination devices. Other routing functions that identify and record one or more routing paths to destination devices can be used as well for routing function 247. As explained above, the known RIP, OSPF and ISIS routing functions attempt to route message packets to a destination via the shortest path, i.e. fewest number of intervening routers. The known OSPF routing function can also determine the bandwidth of the path to the next hop based on the interface used for forwarding the message packet to the next hop. The known IGRP and EIGRP routing functions attempt to route message packets based on greatest bandwidth, shortest delays and shortest path factors. The known BGP routing function attempts to route message packets based on shortest Autonomous System path (i.e. fewest number of routers within a single administrative control), least multi-exit discriminator ("MED") (i.e. a preference for one route over another that is advertised to neighboring routers, etc.). The OSPF, IGRP, EIGRP and BGP routing functions identify and record one or more routes to destination devices, and attempt to utilize them in order of the applicable routing policy.

Gateway device 240 also includes a known firewall 248. Firewall 248 has a list 252 of permitted message flows ("rules"), i.e. a list of combinations of source IP addresses and ports, destination IP addresses and ports and protocols for message packets that are permitted to pass through the firewall in each direction.

FIG. 1 also illustrates a network administration server 300 which includes a known CPU 321, operating system 322, RAM 323 and ROM 324 on a common bus 325 and storage 326. Network administration server 300 also includes a network communication trouble-shooting program 330, according to the present invention, to determine a cause of a failed network communication and take corrective action. Program 330 is stored in computer-readable disk storage media 326 for execution by CPU 321 via computer-readable random access memory 323. Program 330 includes a table 340 with login/authentication information for each of the routers 36-1 to 36-N and gateway devices 40 and 240 (as well as other gateway devices, routers and firewalls in the networks). When an administrator invokes program 330 because of a failed communication (or upon a failed communication message being sent directly to program 330), program 330 logs on to each of the routers 36-1 to 36-N and gateway devices 40 and 240 in the preferred path using this login/authentication information. Program 330 identifies the routers 36-1 to 36-N and gateway devices 40 and 240 in the preferred path sequentially, starting with the source device or the device which reported the failed communication and checking its routing table for the next hop. Then, program 330 logs on to the next hop and checks its routing table to determine the next hop, etc. Next, program 330 reads and records (a) their respective saved routing tables including, for each destination device in each routing table, a name of the destination device, a destination network, a destination subnet, a name of the next hop device, often called a "destination gateway" (i.e. the next hop router, next hop firewall or the gateway device of the destination subnet), (b) their respective task routing tables including, for each destination device in each task routing table, a name of a job (i.e. name of person currently accessing the task routing table), a name of the destination device, a name of a destination network, a name of a destination subnet, a name of the next hop, often called a "destination gateway" (i.e. the next hop router, next hop firewall or the gateway device of the destination subnet), (c) their respective saved interface tables including a name of router or gateway device currently being accessed, an interface name (for example, ETH0, ETH1, FastETH0, FastETH1) for the router or gateway device, an interface IP address for the router or gateway device and an interface subnet mask (which identify the other IP addresses in the same subnet) for the router or gateway device, (d) their respective task interface tables including identification of a current job (i.e. name of person currently accessing the task routing table), a name of the destination device, a name of the destination network, a name of the destination subnet and a name of a next hop, often called a "destination gateway" (i.e. the next hop router, next hop firewall or the gateway device of the destination subnet) to the destination device. Also, for each firewall in the preferred path, program 330 reads and records the lists of rules 52 and 252 for permitted message flows through the respective firewalls 48 and 248, including permitted combinations of source IP address and port, destination IP address and port and protocol in each direction.

In those cases where the failed communication was due to a misconfigured router in the preferred path receiving the communication but not listing the proper next hop router to the destination device (and not forwarding the communication to the proper next hop router), program 330 stops the foregoing, forward-direction analysis with the misconfigured router. Then, program 330 repeats the foregoing analysis in reverse direction beginning with the destination device and proceeding hop to hop toward the original source device. Typically, all the routers in at least one direction (in this case the reverse direction) will be properly configured to all list their respective next hops in the preferred route. Assuming the list of next hops in reverse order complies with the preferred route, program 330 compares this list of next hops in reverse order to the list of next hops in forward order and notes the error in the routing table for the misconfigured router. For example, assume (a) that routers 36-1 to 36-N (where N=5) in this order are the preferred/only route from the source device 20 to the destination device 220, (b) router 36-2 (in the forward direction) lists a router 37 as the next hop toward the destination device 220 instead of router 36-3 and the communication from device 20 toward device 220 failed at router 36-2 and (c) router 36-3 (in the reverse direction) lists router 36-2 as the next hop toward source device 20 and the communication from device 220 toward device 20 was successful, then program 330 determines that the routing table entry in router 36-2 for destination device 220 should be changed to router 36-3 to match/comply with the successful route in the other direction.

Thus, program 330 identifies as the cause of the failed communication the router whose routing table did not specify the next hop in the preferred route to the destination device. Next, program 330 generates a "test" routing table for the router whose pre-existing routing table did not specify the next hop in the preferred route to the destination device. The "test" routing table lists the next hop in the preferred route to the destination device. Then, using the "test" routing table instead of the pre-existing routing table, program 330 repeats the foregoing analysis for all the routers in the preferred route in both directions to determine if they all list as their next hop the next router in the preferred route. If not, then program 330 generates and uses another "test" routing table for the router that does not list the next hop in the preferred route to the destination device, in the same manner as explained above. When all the routers in the preferred route list the next hop in the preferred route, based on their pre-existing routing table in the absence of a "test" routing table or based on their "test" routing table if program 330 has generated a "test" routing table, program 330 notifies the administrator of each router that needs a respective "test" routing table to implement the preferred route and the "next hop" that needs to be added to the respective routing table to implement the preferred route. In response, the administrator can manually update the routing tables of such routers or direct program 330 to update the routing tables to substitute the "test" routing table for the pre-existing routing table. Alternately, program 330 can automatically update the routing tables to substitute the "test" routing table for the pre-existing routing table when all the routers in the preferred route list the next hop in the preferred route, based on their pre-existing routing table in the absence of a "test" routing table or based on their "test" routing table if program 330 has generated a "test" routing table.

The next hop information from the routing tables of the routers in the preferred route to the destination device may include one or more firewalls in the preferred route. With this information, program 330 identifies all firewalls in the preferred route, including the firewall, if any, of the source computer and the firewall, if any, of the destination computer. Next, program 330 logs on to these firewalls and obtains the rules for permitted message flows for these firewalls to determine if these firewalls permit passage of the message packets of the failed communication, i.e. includes a permitted message flow for the source IP address and port, destination IP address and port and protocol of the failed communication. If not, then program 330 identifies as potentially problematic the firewall which does not permit flow of the message packets of the failed communication. Also, program 330 generates a new "test" list of rules for permitted message flows for the firewall whose pre-existing rules for permitted message flows did not permit the failed communication. The "test" list is a copy of the pre-existing list of rules for permitted message flows in the firewall whose pre-existing rules for permitted message flows did not permit the failed communication and in addition, includes the "test" rule. The "test" rule permits flow of the failed communication through the firewall. Then, program 330 repeats the foregoing analysis for all the firewalls in the preferred route to determine if they all include a rule to permit flow of the failed communication, and uses the "test" list instead of the pre-existing list in this repeat analysis. Program 330 also notifies an administrator of any firewall which did not include a rule to permit the failed communication, and queries the administrator whether the firewall should include such a rule to permit the failed communication. If this firewall should not permit this message flow, then the firewall is proper and should not be changed. Otherwise, the administrator can reconfigure the firewall to substitute the "test" list of rules for the pre-existing list of rules or request that the program 330 substitute the "test" list for the pre-existing list.

FIGS. 2(A-F) illustrate function and operation of program 330 in more detail. In step 400, program 330 receives from an administrator an identification of the source IP address and destination IP address of the failed communication (or can automatically receive this information from the failed communication message sent from the source device or the router which generated the failed communication message). In response, program 330 determines from a server (not shown) the identity of the source device (for example, source computer 20) and the identity of the destination device (for example, destination computer 220) (step 402). Next, program 330 attempts to connect to the source device and destination device (decision 410). For each of the source and destination devices for which program 330 is able to connect (decision 410, yes branch), program 330 fetches their routing and interface configuration (step 414). Next, if program 330 was able to connect to the source device, program 330 determines if the routing and interface configuration information for the source device matches the source device's database, and if program 330 was able to connect to the destination device, program 330 determines if the routing and configuration information for the destination device matches the destination device's database (decision 420). If so (decision 420, yes branch), then program 330 parses the routing and configuration information for each of the source and destination devices (for which program 330 was able to connect and retrieve) for which the interface and routing information matches the device (step 430). If the routing and interface configuration information for the source device does not match the source device's database (decision 420, no branch), then program 330 updates the source and/or destination device's database so that it matches the routing and interface information (step 424), and then proceeds to step 430 to parse the routing and interface information.

Refer again to decision 410, no branch, where program 330 was not able to connect and retrieve routing and interface configuration information from either or both of the source and destination devices. In such a case (decision 410, no branch), program 330 retrieves routing and interface information to the extent it is available from the source and destination devices (step 450). Next, program 330 determines if it was able to retrieve all the routing and interface information from the source and destination devices (decision 460). For any routing and interface information that program 330 was not able to retrieve from the source and destination devices (decision 460, no branch), program 330 queries an administrator to manually input the routing and interface information (step 464). In response, the administrator manually inputs the routing and interface information. Refer again to decision 460, yes branch, where program 330 was able to retrieve all the routing and interface information from the source and destination devices. In such a case, program 330 displays the routing and interface information which was retrieved (step 470), and then queries the administrator whether it wants to use this routing and interface information (decision 474). If not, then program 330 proceeds to step 464 to request the administrator to enter any other routing and interface information that it wants to use. Refer again to decision 474, yes branch or after step 464 where the administrator is satisfied with the routing and interface information for the source and destination devices. In such a case, program 330 proceeds to step 430 to parse the routing and interface configuration information.

In decision 500, program 330 begins to analyze the "current device". During the first iteration of steps 500-524, the current device is the source device. (During subsequent iterations of steps 500-524, the "current" device is the next hop device relative to the prior iteration of steps 500-524.) If the current device is the source device (decision 500, no branch), then program 330 checks the routing table for the source device to determine if there is a specific preferred route to the destination device (decision 510). If not (decision 510, no branch), then program 330 determines if the source device has a default preferred route to the destination device (decision 514). The default preferred route includes the next hop toward the destination device. If the source device does not have a default preferred route, either because the current device is the destination device or has mistakenly omitted a default preferred route (decision 514, no branch), then program 330 begins a reverse path analysis beginning from the current device, as described below. If the source device has a default preferred route (decision 514, yes branch) or after decision 510 where the source device has a specific route to the destination device, then program 330 inserts an identity of the next hop, preferred route and source device's interface information into the task database (step 520). Next, program 330 sets the next hop device (relative to the current device) as the current device (step 524). Next, program 330 proceeds to decision 410 and steps 414-430 to attempt to retrieve the routing and interface information for the now current device, as explained above, and then repeats steps 500-524 for the now current device. After a number of iterations of steps 500-524 corresponding approximately to the number of routers in the preferred route, the "current" device will be the destination device (decision 500, yes branch). At that point, program 330 concludes its analysis of the routers in the preferred path (step 502) and proceeds to step 600.

After the iteration of step 502 where the current device is the destination device or if there is no specific route or default route to the destination device from the current device, program 330 begins to determine routers in the reverse direction from the current device to the original source device (step 600). Next, program 330 sets the original source device as the new destination device (step 602). Next, program 330 performs the foregoing steps 410'-474' and 500'-524' for the devices in the preferred path in reverse order beginning with the current device (as set in the foregoing iterations of steps 410-474 in forward order). Steps 410'-474' are identical to steps 410-474, respectively, except for the reversal of order of the "current" devices under analysis in steps 410'-474'. Steps 500'-524' are identical to steps 500-524, respectively, except for the reversal of order of the "current" devices under analysis in steps 500'-524'. Thus, in decision 500', program 330 determines if the current device is the original source device, and if so, the analysis of the path in reverse order is complete (from the last device analyzed in the forward order) to the original source device.

Next, program 330 determines if there is a complete path of routers (in forward order) from the original source device to the original destination device, i.e. all the routers in the path have a routing table which lists a next hop that leads to the destination device according to the preferred route (decision 800). Next, program 330 determines if there is a complete path, in reverse order, from the original destination device to the original source device (decision 810). If so (decision 810, yes branch), then program 330 determines if the path in forward order is same as the path in reverse order, except for the direction (decision 814, yes branch). If so (decision 814, yes branch), then the routing tables are good and do not need update (step 816). If not (decision 814, no branch), then program 330 displays the list of routers in the forward direction and the list of routers in the reverse direction (step 818). Program 330 highlights differences between the two lists, i.e. the routers in the forward path that are not part of the reverse path, and vice versa (step 820). Program 330 also lists/identifies changes to the routing tables of one or more routers, in either direction, to make the forward and reverse routes the same and correspond to the preferred route as indicated in the router of source gateway device 40 or the first router in the path from the source device to the destination device.

Refer again to decision 800, no branch where there is not a complete path, in forward order, from the original source device to the original destination device. In such a case, program 330 compiles a list of routers, each with an identification of its next hop in forward order and a destination IP address of the original destination IP address, from the source device to the most downstream router identified in step 524 en route to the original destination device (step 802).

Refer again to decision 810, no branch where there is not a complete path, in reverse order, from the original destination device to the original source device (decision 810, no branch). In such a case, then program 330 compiles a list of routers, each with an identification of its next hop in reverse order and a destination IP address of the original source IP address from the most downstream router identified in step 524 to the original source device (step 822).

After either step 802 or step 822, program 330 reverses/inverts the routers in the list of routers (step 840) and determines if the name and destination gateway/next hop router in the task database list (the first router in path during the first iteration of decision 844) match the name and destination gateway/next hop router of the current router in the inverted list of routers (decision 844). If so (decision 844, yes branch), then program 330 adds the name of the current router to the list of routers to display (step 846). Next, program 330 determines if there are more routers in the inverted list (decision 848). If so (decision 848, yes branch), then program 330 makes the next router in the inverted list the current router (step 850), and loops back to decision 844 to repeat the foregoing steps 844, 846 and 848. Refer again to decision 844, no branch where the name and destination gateway/next hop router from the task list does not match the name and destination gateway/next hop router of the current router in the inverted list of routers. In such a case, program 330 adds the name of the next hop router from the task database to the list of routers to display and marks the next hop router as missing (step 854). Then, program 330 makes the next router in the inverted list the current router (step 850), and loops back to decision 844 to repeat the foregoing steps 844, 846 and 848 for the now current router. Program 330 repeats the foregoing steps 844-854 for each router in the inverted list (decision 848, no branch) at which time program 330 displays the routers in the list of routers to display (step 860).

The next hop information from the routing tables of the routers in the route to the destination device may include one or more firewalls in the preferred route (decision 900). Program 330 identifies all firewalls in the preferred route (step 902), including the firewall, if any, of the source computer and the firewall, if any, of the destination computer. Next, program 330 logs on to these firewalls and obtains the rules for permitted message flows for these firewalls (step 908) and determines if these firewalls permit passage of the message packets of the failed communication (decision 910). If not (decision 910, no branch), then program 330 identifies as potentially problematic the firewall which does not permit flow of the message packets of the failed communication and creates a notification of this potential problem (step 916).

Also, program 330 generates a new "test" list of rules for permitted message flows for the firewall whose pre-existing rules for permitted message flows did not permit the failed communication (step 920). The "test" list is a copy of the pre-existing list of rules for permitted message flows in the firewall whose pre-existing rules for permitted message flows did not permit the failed communication and in addition, includes the "test" rule. The "test" rule permits flow of the failed communication through the firewall. Then, program 330 repeats the foregoing analysis for all the firewalls in the preferred route (steps 902, 908, decision 910, step 916 and step 910) to determine if they all include a rule to permit flow of the failed communication, but uses the "test" list instead of the pre-existing list in this repeat analysis. In step 916, program 330 also notifies an administrator of any firewall which did not include a rule to permit the failed communication, and queries the administrator whether the firewall should include such a rule to permit the failed communication. If this firewall should not permit this message flow, then the firewall is proper and should not be changed. Otherwise, the administrator can configure the firewall or notify program 330 to configure the firewall to substitute the "test" list of rules for the pre-existing list of rules or request that the program 330 substitute the "test" list for the pre-existing list (step 930).

Program 330 can be loaded into server 300 from a computer readable media 350 such as magnetic tape or disk, optical media, DVD, semiconductor memory, memory stick, etc. or downloaded from the Internet via TCP/IP adapter card 360.

Based on the foregoing, a system, method and program for determining failure in network communication have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A computer program product for determining a cause of a failure of a communication from a source device to a destination device, a preferred route from said source device to said destination device comprising a series of routers in a forward order, said program product comprising:
   a computer-readable, tangible storage device;
   first program instructions to determine one or more initial routers in said series in said forward order from said source device toward said destination device, a last of said initial routers in said forward order not designating a next router in said series in said forward order toward said destination device;
   second program instructions to determine said series of routers in a reverse order from said destination device toward said source device;
   third program instructions to identify a router in said series of routers in said reverse order which matches the last of said initial routers in said forward order, identify a next prior router from the matching router in said series of routers in said reverse order which should be designated by said last of said initial routers in said forward order as a next router in said forward order toward said destination device, and generate a notification as to which router said last of said initial routers should designate as its next router in said forward order toward said destination device; and wherein
   said first, second and third program instructions are stored on said computer-readable, tangible storage device.

2. A computer program product as set forth in claim 1 wherein:
    said first program instructions determine said one or more initial routers in said series in forward order in part by querying said source device for its next router toward said destination device and querying the next router of said source device for a next router of said next router of said source device toward said destination device; and
    said second program instructions determine said series of routers in said reverse order from said destination device toward said source device by querying said destination device for its next router toward said source device and querying the next router of said destination device for a next router of said next router of said destination device toward said source device.

3. A computer program product as set forth in claim 1 further comprising:
    fourth program instructions to determine a firewall in said preferred route and whether said firewall includes a rule to permit flow of said message from said source device to said destination device through said firewall, and if not, generate a notification that said firewall does not includes a rule to permit flow of said message from said source device to said destination device through said firewall; and wherein
    said fourth program instructions are stored on said computer-readable, tangible storage device.

4. The computer program product of claim 1 wherein the one or more initial routers comprise at least two routers.

5. The computer program product of claim 4 wherein the at least two routers reside in at least two respective computing systems than do not have a firewall.

6. A computer system for determining a cause of a failure of a communication from a source device to a destination device, a preferred route from said source device to said destination device comprising a series of routers in a forward order, said system comprising:
    a central processing unit, a computer readable memory and a computer-readable, tangible storage device;
    first program instructions to determine one or more initial routers in said series in said forward order from said source device toward said destination device, a last of said initial routers in said forward order not designating a next router in said series in said forward order toward said destination device;
    second program instructions to determine said series of routers in a reverse order from said destination device toward said source device;
    third program instructions to identify a router in said series of routers in said reverse order which matches the last of said initial routers in said forward order, identify a next prior router from the matching router in said series of routers in said reverse order which should be designated by said last of said initial routers in said forward order as a next router in said forward order toward said destination device, and generate a notification as to which router said last of said initial routers should designate as its next router in said forward order toward said destination device; and wherein
    said first, second and third program instructions are stored in said computer-readable, tangible storage device for execution by said central processing unit via said computer readable memory.

7. A computer system as set forth in claim 6 wherein:
    said first program instructions determine said one or more initial routers in said series in forward order in part by querying said source device for its next router toward said destination device and querying the next router of said source device for a next router of said next router of said source device toward said destination device; and
    said second program instructions determine said series of routers in said reverse order from said destination device toward said source device by querying said destination device for its next router toward said source device and querying the next router of said destination device for a next router of said next router of said destination device toward said source device.

8. A computer system as set forth in claim 6 further comprising:
    fourth program instructions to determine a firewall in said preferred route and whether said firewall includes a rule to permit flow of said message from said source device to said destination device through said firewall, and if not, generate a notification that said firewall does not includes a rule to permit flow of said message from said source device to said destination device through said firewall; and wherein
    said fourth program instructions are stored on said computer-readable, tangible storage device for execution by said central processing unit via said computer readable memory.

9. The method of claim 6 wherein the one or more initial routers comprise at least two routers.

10. The method of claim 9 wherein the at least two routers reside in at least two respective computing systems than do not have a firewall.

11. A computer implemented method for determining a cause of a failure of a communication from a source device to a destination device, a preferred route from said source device to said destination device comprising a series of routers in a forward order, said method comprising the steps of:
    a computer determining one or more initial routers in said series in said forward order from said source device toward said destination device, a last of said initial routers in said forward order not designating a next router in said series in said forward order toward said destination device;
    the computer determining said series of routers in a reverse order from said destination device toward said source device; and
    the computer identifying a router in said series of routers in said reverse order which matches the last of said initial routers in said forward order, and the computer identifying a next prior router from the matching router in said series of routers in said reverse order which should be designated by said last of said initial routers in said forward order as a next router in said forward order toward said destination device; and
    the computer generating and initiating display of a notification as to which router said last of said initial routers should designate as its next router in said forward order toward said destination device.

12. A computer implemented method as set forth in claim 11 wherein:
    the step of the computer determining said one or more initial routers in said series in forward order comprises in part the steps of the computer querying said source device for its next router toward said destination device and the computer querying the next router of said source device for a next router of said next router of said source device toward said destination device; and
    the step of the computer determining said series of routers in said reverse order from said destination device toward said source device comprises in part the steps of the computer querying said destination device for its next router toward said source device and the computer querying the next router of said destination device for a next router of said next router of said destination device toward said source device.

13. A computer implemented method as set forth in claim 11 further comprising the step of:

the computer determining a firewall in said preferred route and whether said firewall includes a rule to permit flow of said message from said source device to said destination device through said firewall, and if not, the computer generating a notification that said firewall does not includes a rule to permit flow of said message from said source device to said destination device through said firewall.

14. The system of claim 11 wherein the one or more initial routers comprise at least two routers.

15. The system of claim 14 wherein the at least two routers reside in at least two respective computing systems than do not have a firewall.

* * * * *